(12) United States Patent
Zick

(10) Patent No.: US 12,097,463 B2
(45) Date of Patent: Sep. 24, 2024

(54) GAS STREAM PURIFICATION BY ADSORPTION WITH PRE-REGENERATION IN A CLOSED LOOP

(71) Applicant: L'Air Liquide, Societe Anonyme pour l'Etude et l'Exploitation des Procedes Georges Claude, Paris (FR)

(72) Inventor: Golo Zick, Sassenage (FR)

(73) Assignee: L'Air Liquide, Société Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 151 days.

(21) Appl. No.: 17/592,310

(22) Filed: Feb. 3, 2022

(65) Prior Publication Data
US 2022/0250001 A1    Aug. 11, 2022

(30) Foreign Application Priority Data

Feb. 5, 2021 (FR) .................................. FR 2101099

(51) Int. Cl.
*B01D 53/04* (2006.01)
*B01D 53/047* (2006.01)

(52) U.S. Cl.
CPC ........ *B01D 53/0462* (2013.01); *B01D 53/047* (2013.01); *B01D 2256/245* (2013.01); *B01D 2257/504* (2013.01); *B01D 2257/80* (2013.01)

(58) Field of Classification Search
CPC .............................. B01D 53/04; B01D 53/047
See application file for complete search history.

(56) References Cited

U.S. PATENT DOCUMENTS

| 4,028,069 | A | 6/1977 | Nolley, Jr. et al. |
| 9,272,963 | B2 | 3/2016 | Bernhardt et al. |
| 10,905,995 | B2 | 2/2021 | Prince et al. |
| 11,034,903 | B2 * | 6/2021 | Doong ............... B01D 53/0462 |
| 2018/0126299 | A1 * | 5/2018 | Doong ............... B01D 53/0462 |
| 2019/0143258 | A1 | 5/2019 | Meirav et al. |
| 2020/0002633 | A1 | 1/2020 | Doong et al. |

FOREIGN PATENT DOCUMENTS

| FR | 2 969 008 | 6/2012 |
| FR | 3 035 337 | 10/2016 |
| FR | 3 046 086 | 6/2017 |

OTHER PUBLICATIONS

French Search Report for FR 2 101 099, mailed Oct. 28, 2021.

* cited by examiner

*Primary Examiner* — Sharon Pregler
(74) *Attorney, Agent, or Firm* — Yan Jiang; Christopher J. Cronin

(57) ABSTRACT

A gas stream is purified by a TSA adsorption scheme including at least two adsorbers following, in an offset manner, a cycle including an adsorption phase, and a subsequently, a regeneration phase. The regeneration phase includes a depressurization step, a pre-regeneration step and a regeneration step. A gas circulator is used to circulate the gas within the adsorber in the pre-regeneration step in a closed loop while the circulating gas is heated with a heater.

6 Claims, 2 Drawing Sheets

[Fig. 1]
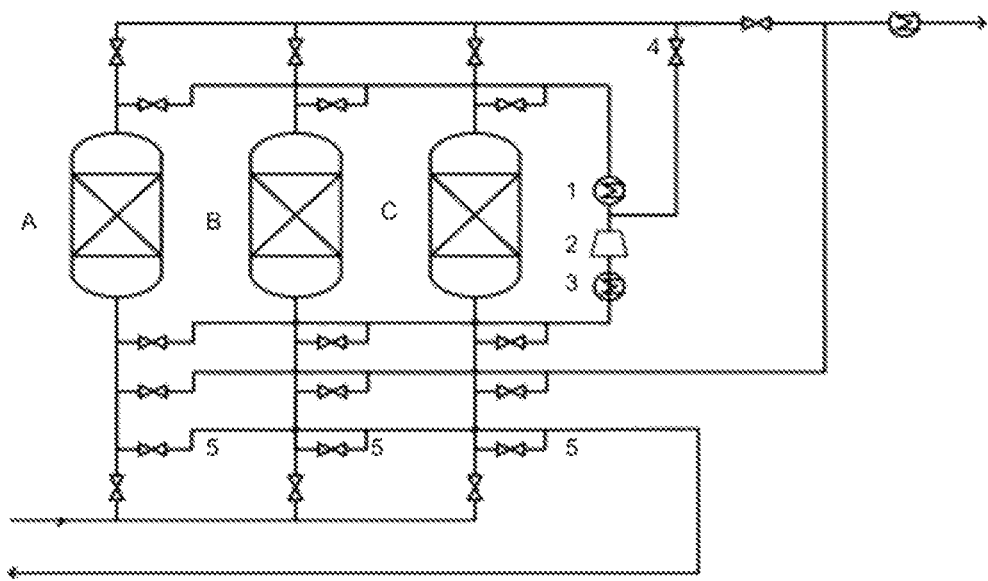
[Fig. 2]
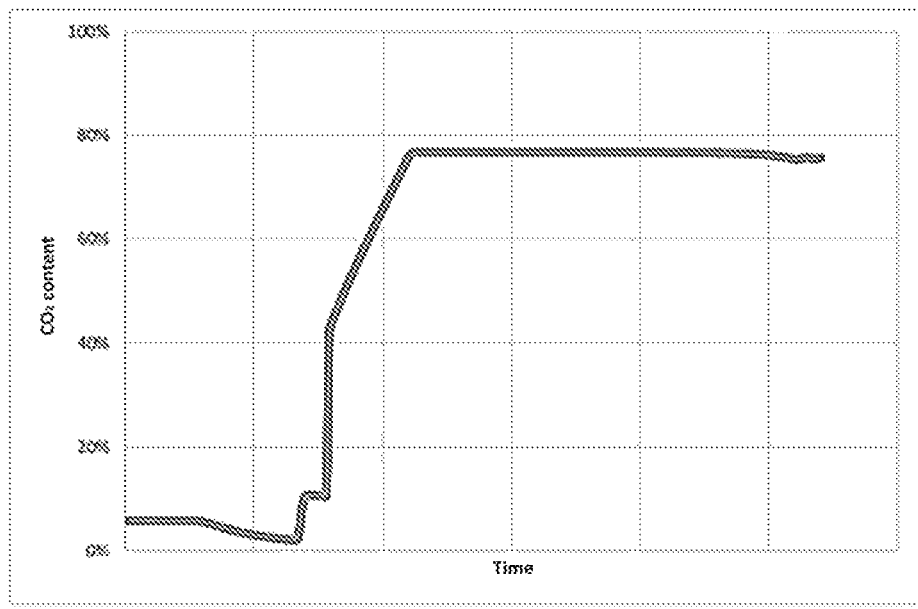

[Fig. 3]
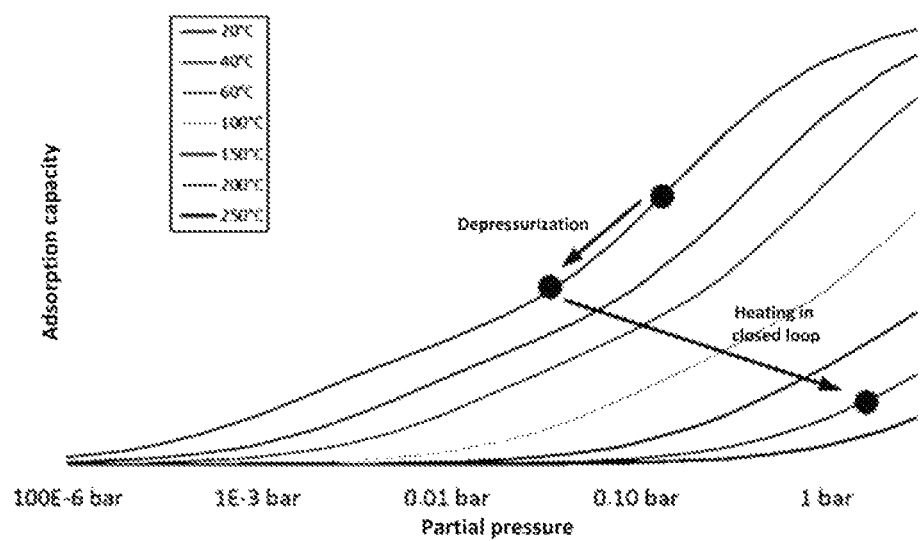

GAS STREAM PURIFICATION BY ADSORPTION WITH PRE-REGENERATION IN A CLOSED LOOP

CROSS-REFERENCE TO RELATED APPLICATIONS

This application claims the benefit of priority under 35 U.S.C. § 119 (a) and (b) to French patent application No. FR 2101099, filed Feb. 5, 2021, the entire contents of which are incorporated herein by reference.

BACKGROUND

Field of the Invention

The present invention relates to a process for purifying a gas stream by TSA adsorption comprising a step of pre-regeneration that does not use any regeneration gas external to the adsorber in pre-regeneration and to the plant used by the process.

Related Art

In many industrial applications, the need for a separation of species of a gas stream arises. For this, various methodologies have been developed, which differ by their optimal operating range; for example membrane systems are generally well suited to carrying out a lower cost primary separation without achieving high purities. If these high purities are needed, for example for a downstream liquefaction, adsorption systems are commonly used. These systems become loaded with impurities and therefore require a cyclic regeneration, which can be carried out by pressure or temperature swing or else a combination of the two effects. In the case of an impurity with a low content, it is generally preferred to use a regeneration which is based mainly on a temperature swing (TSA=Temperature Swing Adsorption), without however being insensitive to pressure swings, and which therefore operates over a relatively long cycle time due to the thermal inertia of the system in its entirety. In order to ensure a continuous operation, several adsorption cylinders in parallel are often operated, which are at various steps of adsorption or regeneration.

Conventionally, a TSA process cycle comprises the following steps:
a) purifying the gas stream by adsorption of the impurities at a pressure above atmospheric pressure and close to ambient temperature (also referred to as production phase),
b) depressurizing the adsorber to atmospheric pressure;
c) regenerating the adsorbent at atmospheric pressure by means of a regeneration gas heated up to a temperature customarily between 100° C. and 300° C. by means of one or more heat exchangers,
d) cooling the adsorbent to ambient temperature, and
e) repressurizing the adsorber with purified gas stream resulting, for example, from another adsorber that is in production phase.

For the regeneration, in order to achieve the temperature swing, i.e. the input of energy for heating, use is customarily made of a stream of hot gas as carrier, injected into the cylinder countercurrentwise to the adsorption stream. For this regeneration gas, an inert gas is then generally chosen which is adsorbed very little in order to minimize its impact on the adsorption capacity and so as not to pollute the portions which have remained out of contact with the impurity during the production phase. In certain processes, there is a usable vent gas, for example nitrogen which has previously been used as a cold source in liquid form or a portion of the production which must be discharged since it is loaded with another impurity that is not relevant for the adsorption in question. In other processes, which are actually the subject of the present invention, there is no such gas source. In this case, it is necessary either to provide a dedicated gas source for the regeneration, for example a store of liquid nitrogen with an atmospheric evaporator, or to use a fraction of the purified stream for this purpose. This fraction may sometimes be recycled further upstream in the process, but in any case there are additional costs to be expected for the losses and/or oversizing and the operation of the units upstream.

Systems of direct heating exist which transmit the heat by conduction through the bed, but these systems have the drawback of being quite limited in terms of transferable power and therefore require a relatively long regeneration time. Moreover, the desorbed impurities must be discharged from the adsorbent which again requires a carrier gas or a pumping system on the cylinder.

Starting from there, one problem that arises is that of providing a new way of regenerating an adsorbent when no regeneration gas is readily available. The losses and recyclings should be minimized as much as possible.

SUMMARY OF THE INVENTION

One solution of the present invention is a plant P for purifying a gas stream by TSA adsorption comprising:
  at least two adsorbers (A, B or C) following, in an offset manner, a cycle where, following one another, there is an adsorption phase and a regeneration phase comprising a depressurization step, a pre-regeneration step and a regeneration step,
  a depressurization means 5 for depressurizing the adsorber at the start of the regeneration phase,
  a means for isolating the adsorber in pre-regeneration from the rest of the plant,
  a gas circulator 2 for circulating the gas within the adsorber in pre-regeneration in a closed loop, and
  a heater 3 for heating the gas circulating in the closed loop.

In other words, the closed loop comprises, in the direction of circulation of the gas, the adsorber in pre-regeneration, the gas circulator, the heater, and the pipework for connecting the various components and for circulating the gas between these various components.

For a further understanding of the nature and objects for the present invention, reference should be made to the detailed description, taken in conjunction with the accompanying drawing, in which like elements are given the same or analogous reference numbers and wherein:

BRIEF DESCRIPTION OF THE FIGURES

FIG. 1 is a schematic of an example of a plant according to the invention.

FIG. 2 is a graph of CO2 content, vs. time, of the regeneration gas during closed loop circulation.

FIG. 3 is a graph of adsorption capacity versus pressure that is exhibited with practice of the invention.

DETAILED DESCRIPTION OF THE INVENTION

An example of a plant according to the invention is depicted in FIG. 1.

The expression "isolating the adsorber" is understood to mean the cutting off of a possibility of fluid exchange between the pre-regeneration closed loop and the rest of the cycle, typically by valves. It is nevertheless possible to connect the pre-regeneration closed loop with the rest of the cycle at chosen locations in order to temporarily regulate the pressure of the loop by charging or discharging gas.

The expression "gas within the adsorber" is understood to mean the gas within the adsorber at the end of the adsorption phase and after the depressurization step of the regeneration phase.

The expression "gas circulator" is understood to mean a fan or a compressor with a low compression ratio (typically less than 1.5), just sufficient to overcome the pressure drops of the bed and to maintain a flow in a closed loop.

These pieces of equipment are used to carry out a preliminary regeneration in a closed loop. Specifically, often more than half of the energy supplied during a regeneration is only used to heat the material of the adsorbent itself and the equipment of the cylinder, without this being directly of use in the final objective of desorbing the gas trapped on the adsorbent. This is only a thermal inertia to be overcome and which does not require a specific gas quality.

By flushing the adsorber in a closed loop, it is possible to finely regulate the supply of heat which is a function of the flow rate and of the temperature. At the same time, the gas circulating in the closed loop becomes concentrated in impurity over time since the adsorption capacity drops with the rise in temperature.

This impurity, which was stopped on the adsorbent during the adsorption phase and which is desorbed during the pre-regeneration and the regeneration, may for example be chosen from $CO_2$, a hydrocarbon, water or an air gas.

Depending on the case, the plant according to the invention may have one or more of the features below:
  the depressurization means 5 comprises a pressure-regulating valve.
  The pressure-regulating valve makes it possible to link the closed loop to the vent or the recycle in order to be able to maintain the pressure which varies as a function of the heating and of the desorption of the impurity which had been captured in the adsorber,
  the plant comprises a cooler 1 for cooling the gas circulating in the closed loop upstream of the gas circulator. This cooler is used when the temperature of the gas circulating in the close loop is too high for the operation of the gas circulator. The presence of the cooler or the degree of the cooling depend on the technology and design of the gas circulator. Typically, the gas circulator will make it possible to cool the gas circulating in the closed loop to a temperature below 80° C., preferably below 60° C. In this case, the closed loop will comprise, in the direction of circulation of the gas, the adsorber in pre-regeneration, the gas circulator, the heater, and the pipework for connecting the various components and for circulating the gas between these various components,
  the gas stream comprises at least 90% $CH_4$, preferably at least 97% $CH_4$, and the adsorbers comprise an active material which will adsorb at least a portion of the $CO_2$,
  the plant comprises a means 4 for introducing a regeneration gas into the adsorber following the regeneration step. It should be noted that the regeneration gas will preferably correspond to a portion of the purified gas stream. Also the means of introduction will preferably be a means for introducing a portion of the purified gas stream into the adsorber,
  the plant comprises a means 3 for heating the regeneration gas. It should be noted that the heating means is preferably the same heater as the one for heating the gas circulating in the closed loop,
  the plant comprises at least three adsorbers A, B and C,
  the plant comprises a means for cooling the adsorber before the adsorption. This means will preferably be a means for sending all or a large portion of the gas purified by another adsorber to the adsorber that has just been regenerated.

By way of example, the plant according to the invention could be inserted into a plant for producing liquid biomethane comprising:
  a digester for producing biogas,
  a membrane separation unit for producing biomethane from biogas,
  the plant P according to the invention for producing purified biomethane from the biomethane leaving the membrane separation unit, and
  a unit for liquefying the purified biomethane.

Another subject of the present invention is a process for purifying a gas stream by TSA adsorption, using a plant according to the invention and comprising, during the pre-regeneration, a step of depressurizing an adsorber, a step of isolating the depressurized adsorber in a closed loop and a step of heating and circulating the gas that is in the isolated adsorber in the closed loop.

Depending on the case, the process according to the invention may have one or more of the features below:
  the pre-regeneration comprises a step of cooling the gas circulating in the closed loop upstream of the gas circulator,
  in the heating step, the gas that is in the adsorber is heated to a temperature of between 100° C. and 300° C.,
  in the depressurization step, the gas that is in the isolated adsorber is depressurized to a pressure of between 1 and 3 bar, preferably between 1.5 and 2.5 bar; the depressurization may be temporarily reactivated during the pre-regeneration step in order to stabilize the operating pressure,
  the process comprises, after the pre-regeneration, the introduction of a regeneration gas into the adsorber. The regeneration gas should comprise a small amount of the impurity which has been adsorbed in the adsorber during the adsorption phase. The term "small amount" is understood to mean less than or equal to the specification of content of impurity in the final product,
  the regeneration gas is a portion of the gas stream purified by the process. Preferably, this portion will represent less than 10%, more preferably less than 5%, of the flow of the purified gas stream,
  the regeneration gas is heated to a temperature of between 100° C. and 300° C.,
  the pre-regeneration represents between 5% and 15% of the cycle followed by each adsorber.

By way of example, the process according to the invention could be included in a process for producing liquid biomethane using the plant for producing liquid biomethane described previously and comprising the following steps:
  a) anaerobic digestion of biomass so as to produce biogas,
  b) membrane separation of the biogas so as to produce biomethane,
  c) purification of the biomethane in the plant P according to the process as defined previously, and
  d) liquefaction of the purified biomethane.

The invention will now be described in more detail using the example below.

Taken as an example—with no limitation to this specific application or process—is the purification of a stream of methane coming from a membrane pre-purification with an impurity of 2% carbon dioxide. The methane is intended to be liquefied, therefore the permissible carbon dioxide limit is of the order of 50 ppm in order to prevent the solidification thereof. In this process, no source of a regeneration gas is naturally available, since the liquefaction takes place via a closed refrigeration cycle and the methane is liquefied entirely.

The succession of the various steps of the operation is conventional and is not repeated here except for the regeneration, which is innovative.

After the depressurization to a pressure level which enables a regeneration over an optimal pressure level with respect to the risk of attrition, size of the circulator and the rate of the supply of heat (1 to 3 bar), the circuit comprising the depressurized adsorber loaded with $CO_2$ and also the circulator and its heater are isolated from the rest of the system. A pressure-regulating valve nevertheless links this circuit to the vent or the recycle in order to be able to maintain the pressure, which varies as a function of the heating and of the desorption of the $CO_2$.

By flushing the adsorber in a closed loop, it is possible to finely regulate the supply of heat, which is a function of the flow rate and of the temperature. At the same time, the gas becomes concentrated in $CO_2$ over time, as can be seen in FIG. 2, whilst the adsorbent contained in the adsorber is discharged of $CO_2$.

Against all expectations, this high $CO_2$ content will not again charge the adsorbent contained in the adsorber since, as the total pressure has been reduced, the $CO_2$ partial presure does not rise much. However, the increase in temperature lowers the adsorption capacity so that the charging of the adsorbent has already greatly reduced when the final temperature which is targeted with the loop is reached. This phenomenon is depicted in FIG. 3.

Therefore, the pre-regeneration is not used only to heat the inert portions of the adsorber, but already begins the desorption of the $CO_2$ from the adsorber in a significant manner.

Once the targeted temperature is reached, generally between 100° C. and 300° C., the steps of final regeneration may begin. For this, a gas comprising the least $CO_2$ possible and which is only adsorbed very slightly is needed.

Therefore, a part withdrawn from the purified gas stream is chosen which is sent to liquefaction. It turns out that the part withdrawn needed represents less than 10%, indeed even less than 5%, of the flow of the purified gas stream, which is remarkably low compared to the prior art. This withdrawn gas cannot be sent directly to the hot adsorber, since the drop in temperature of the adsorbent would lead to a higher adsorption capacity and therefore to the re-adsorption of the $CO_2$ which would still be found therein. It is therefore necessary firstly to heat this gas in order to create a well regenerated zone without residual impurities in the gas phase. Once this zone is established, the heater is shut down and this hot and clean zone is pushed by piston effect through the whole adsorber. A state is therefore achieved in which the whole of the adsorber is well regenerated but still very hot (temperature close to the targeted maximum heating temperature). In order to avoid a loss of $CH_4$, this regeneration flow may be sent back for recycling to the membrane system upstream.

Before restarting an adsorption phase, the adsorber and the adsorbent must be cooled. For this, it is possible to send all or a large portion of the gas purified by another adsorber through the hot but clean adsorber. This way of proceeding is much less expensive and easier to implement than a system with a specific flow for the cooling of the adsorber.

The solution according to the invention makes it possible to generate production compositions and flows which are sufficiently stable throughout the duration of a cycle. It therefore has only a very small impact on the units upstream and downstream.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A plant for purifying a gas stream by TSA adsorption, comprising:
   at least two adsorbers configured in a countercurrent arrangement, following, in an offset manner, a cycle comprising subsequent phases of an adsorption phase and a regeneration phase, wherein the adsorption phase includes an adsorption step and a depressurization step, and wherein the regeneration phase includes a pre-regeneration step and a regeneration step;
   a pressure-regulating valve for depressurizing the adsorber at the start of the regeneration phase;
   a gas circulator for circulating the gas within the adsorber in pre-regeneration in a closed loop; and
   a heater for heating the gas circulating in the closed loop.

2. The plant of claim 1, further comprising a cooler for cooling the gas circulating in the closed loop upstream of the gas circulator.

3. The plant of claim 1, wherein the gas stream comprises at least 90 vol % $CH_4$, and the adsorbers comprise an active material which will adsorb at least a portion of $CO_2$.

4. The plant of claim 1, further comprising a means for introducing a regeneration gas into the adsorber following the regeneration step.

5. The plant of claim 1, further comprising a means for heating the regeneration gas.

6. The plant of claim 1, wherein the gas stream comprises at least 97 vol % $CH_4$ and the adsorbers comprise an active material which will adsorb at least a portion of $CO_2$.

\* \* \* \* \*